US010156906B2

(12) United States Patent
Yamamoto et al.

(10) Patent No.: US 10,156,906 B2
(45) Date of Patent: Dec. 18, 2018

(54) SYSTEMS AND METHODS FOR DISTINGUISHING GESTURES

(71) Applicants: Honda Motor Co., Ltd., Tokyo (JP); Edge 3 Technologies, Inc., Phoenix, AZ (US)

(72) Inventors: Stuart Yamamoto, La Mirada, CA (US); Tarek El Dokor, Phoenix, AZ (US); Graeme Asher, Seattle, WA (US); Jordan Cluster, Tempe, AZ (US); Matt Conway, Seattle, WA (US); Josh King, Mesa, AZ (US); James E. Holmes, Mesa, AZ (US); Matt McElvogue, Seattle, WA (US); Churu Yun, Seattle, WA (US)

(73) Assignees: Honda Motor Co., Ltd., Tokyo (JP); Edge 3 Technologies, Inc., Phoenix, AZ (US)

( * ) Notice: Subject to any disclaimer, the term of this patent is extended or adjusted under 35 U.S.C. 154(b) by 0 days.

(21) Appl. No.: 14/874,178

(22) Filed: Oct. 2, 2015

(65) Prior Publication Data
US 2016/0103499 A1 Apr. 14, 2016

Related U.S. Application Data

(60) Provisional application No. 62/063,341, filed on Oct. 13, 2014.

(51) Int. Cl.
*G09G 5/00* (2006.01)
*G06F 3/01* (2006.01)
(Continued)

(52) U.S. Cl.
CPC .......... *G06F 3/017* (2013.01); *G06F 3/04883* (2013.01); *G06K 9/00335* (2013.01); *G06K 9/00832* (2013.01)

(58) Field of Classification Search
CPC ........ B60K 35/00; B60K 37/02; B60K 37/06; B60K 2350/102; B60K 2350/1024;
(Continued)

(56) References Cited

U.S. PATENT DOCUMENTS 8,390,592 B2 3/2013 Grundmann et al.
2006/0279528 A1 12/2006 Schobben et al.
(Continued)

FOREIGN PATENT DOCUMENTS

EP 2213501 4/2010

OTHER PUBLICATIONS

"Hand-movement-based in-vehicle driver/front-seat passenger discrimination for centre console controls", E Herrmann et al.; Image Processing: Algorithms and Systems VIII; Proc. of SPIE-IS&T Electronic Imaging, SPIE vol. 7532, 75320U (Feb. 8, 2010) © 2010 SPIE-IS&T CCC code: 0277-786X/10/$18 doi: 10.1117/12. 838918.*

(Continued)

*Primary Examiner* — Mark Edwards
(74) *Attorney, Agent, or Firm* — Rankin, Hill & Clark LLP

(57) ABSTRACT

A gesture control system includes a processor, the processor in communication with a plurality of sensors. The processor is configured to perform the steps of detecting, using the plurality of sensors, a gesture in a volume occupied by a plurality of occupants, analyzing a prior knowledge to associate the gesture with one of the plurality of occupants, and generating an output, the output being determined by the gesture and the one of the plurality of occupants.

20 Claims, 9 Drawing Sheets

(51) Int. Cl.
*G06F 3/0488* (2013.01)
*G06K 9/00* (2006.01)

(58) Field of Classification Search
CPC ...... B60K 2350/1028; B60K 2350/104; B60K 2350/106; B60K 2350/1072; G06F 3/0416; G06F 3/0421; G06F 3/04883; G06F 3/04886; G06Q 50/00; G06Q 10/00; G09B 19/00; G06K 9/00; G06K 9/62; G06N 99/00; G06N 3/00
See application file for complete search history.

(56) References Cited

U.S. PATENT DOCUMENTS

| | | | | |
|---|---|---|---|---|
| 2009/0066065 | A1* | 3/2009 | Breed | B60J 10/00 280/735 |
| 2010/0106366 | A1 | 4/2010 | Lehomme et al. | |
| 2011/0296353 | A1* | 12/2011 | Ahmed | G06F 3/017 715/848 |
| 2013/0066526 | A1 | 3/2013 | Mondragon et al. | |
| 2013/0144462 | A1 | 6/2013 | Ricci | |
| 2013/0151031 | A1* | 6/2013 | Ricci | G06F 9/54 701/1 |
| 2014/0183269 | A1* | 7/2014 | Glaser | G06F 21/32 235/492 |
| 2014/0211990 | A1* | 7/2014 | Kim | A63F 13/06 382/103 |
| 2014/0265821 | A1* | 9/2014 | Malon | H05B 33/22 313/504 |
| 2014/0309871 | A1* | 10/2014 | Ricci | B60Q 1/00 701/36 |
| 2016/0034078 | A1* | 2/2016 | Ryu | G06F 3/047 345/174 |

OTHER PUBLICATIONS

Paper: Herrmann, et al.: "Hand-movement-based in-vehicle driver/front-seat passenger discrimination for centre console controls", Proc. SPIE 7532, Image Processing: Algorithms and Systems VIII, 75320U (Feb. 8, 2010), 9 pages.
Article: "BMW shows connected passenger display concept with gesture control" http://telematicsnews.info/2011/02/14/bmw-shows-connected-passenger-display-concept-with-gesture-control_f2143/, Feb. 14, 2011, 2 pages.
Article: Alabaster, J.: "Audi Shows Gesture-driven, Three-panel, Heads-up Dashboard Display", http://www.pcworld.com/article/247783/audi_shows_gesturedriven_threepanel_headsup_dashboard_display.html, Jan. 10, 2015, 2 pages.

* cited by examiner

SYSTEMS AND METHODS FOR DISTINGUISHING GESTURES

CROSS-REFERENCE TO RELATED APPLICATIONS

This application claims priority to provisional Patent Application Ser. No. 62/063,341, filed on Oct. 13, 2014.

FIELD OF THE INVENTION

The present disclosure generally relates to a method and system for gesture control and, more particularly, to methods and systems for distinguishing gestures made by multiple occupants within a vehicle.

BACKGROUND

Modern automobiles present a driver with a multitude of stimuli in the form of information, such as infotainment information, navigation information, driving condition information and vehicle status information. Additionally, stimuli is also presented to a driver from personal devices, such as smartphones. A driver is often required to operate a vehicle while being presented with these and other various stimuli. These stimuli can cause the driver to reduce the attention being paid to operating the vehicle. Additionally, where the driver must physically interact with various vehicle systems, a driver may be forced to divert his or her eyes from the roadway, resulting in a dangerous driving condition. Finally, stimuli related to personal devices, such as text messages received on a mobile device, can significantly affect a driver's ability to operate an automobile.

To address the concern of a driver responding to various stimuli while driving, automobile manufacturers have developed gesture based control systems for automobiles. These control systems can use voice recognition, motion recognition (i.e. physical gesture), or various other methods or combinations of methods for detecting and interpreting the commands of a driver, thereby removing the requirement that the driver reach or visually search for a physical control device (i.e. push-button, rotary knob, touch screen interface, etc.). However, these devices are limited as they can often allow a passenger to unintentionally control the system while moving about the vehicle cabin. This can results in unwanted interaction with various systems of the vehicle. Furthermore, by allowing a passenger access to all of the automobile's subsystems, a driver's privacy can be reduced as the passenger may be able to access private information presented by various vehicle systems. For example, displaying a text message or e-mail received via a mobile device such as a smartphone.

Finally, some vehicle systems are configured to prevent a driver from accessing certain information while the vehicle is in motion. Examples can be text messages or e-mails received via a mobile device, navigation systems, and other systems which may cause the driver to be distracted while driving. While a passenger may be able to perform these tasks without fear of distracting the driver, modern systems may not allow control to be transferred from the driver to a passenger enabling the passenger to use vehicle functions that would otherwise be dangerous to provide to the driver.

SUMMARY

An embodiment of a gesture control system includes a processor, the processor in communication with a plurality of sensors. The processor is configured to perform the steps of detecting, using the plurality of sensors, a gesture in a volume occupied by a plurality of occupants, analyzing a prior knowledge to associate the gesture with one of the plurality of occupants, and generating an output, the output being determined by the gesture and the one of the plurality of occupants.

Another embodiment of a method of transferring control in a gesture control system includes determining a presence of a first occupant within a space using a plurality of sensors, detecting a gesture performed by the first occupant where the gesture corresponds to a request to transfer control of an operation to at least a second occupant, determining the presence of the at least second occupant, and transferring the control of the operation to the at least second occupant when the presence of the at least second occupant has been determined.

An embodiment of a method includes determining a location of a plurality of occupants within a space using a plurality of sensors, defining a gesture control zone associated with each of the plurality of occupants, each gesture control zone having an associated zone permission level, detecting a gesture command within one of the plurality of gesture control zones, determining a required permission associated with the detected gesture command and the one of the plurality of gesture control zones, and initiating an output associated with the detected gesture command when the zone permission level permits execution of the detected gesture command.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Additionally, as this disclosure is directed to a gesture control system 100 and method, it should be recognized that "gesture" can designate any type of potential input, including, but not limited to, hand movements, body movements, spoken words, or various other bio-metric observations of a user or other actions or activities undertaken by a user, whether intentional or unintentional.

Figure 1:
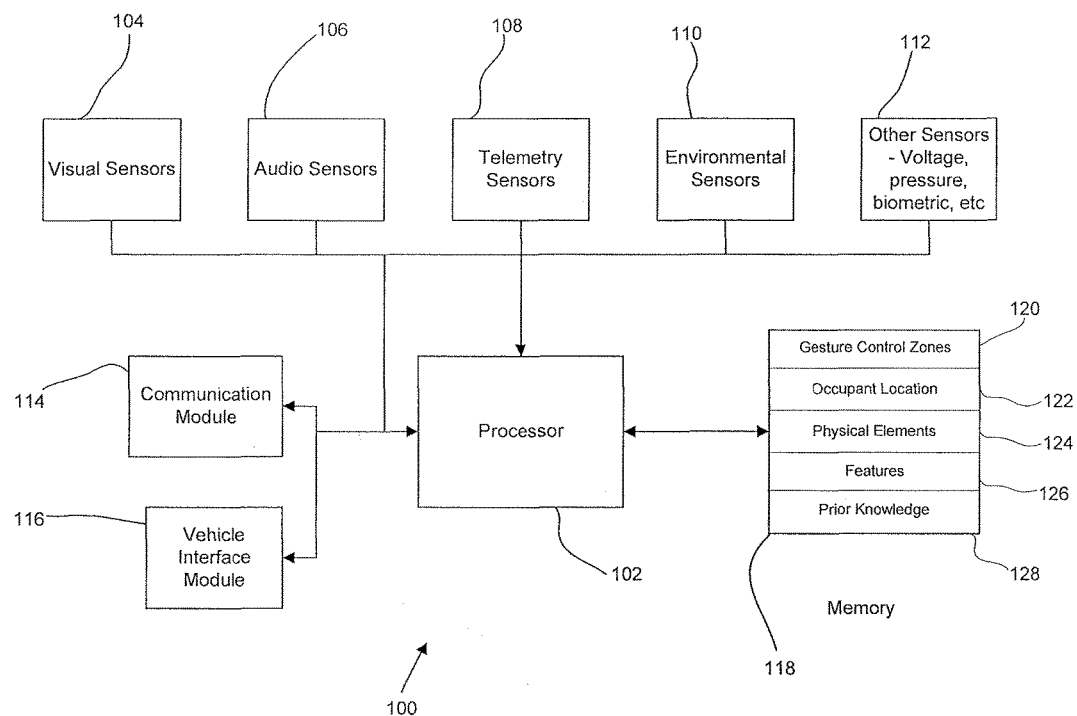
FIG. 1 is a block diagram illustrating functional components of an embodiment of a gesture control system.

FIG. 1 illustrates a possible embodiment of a gesture control system 100. The gesture control system 100 can contain a processor 102. The processor 102 can have multiple I/O ports to accept information from multiple systems in the vehicle. The processor 102 can also be configured to implement processes such as a multi-user gesture control process 200 or an occupant differentiation process 900, discussed in more detail below. The processor 102 can also be configured to implement other processes as are necessary for the operation of the herein described systems and methods. The gesture control system 100 can include a plurality of sensor devices. Non-limiting examples of possible sensing devices include visual sensors 104. Visual sensors 104 can be charge-coupled devices ("CCD") or complimentary metal oxide semiconductor ("CMOS")-based devices. Alternatively, the visual sensors 104 can be stereoscopic sensors. The visual sensors 104 can also be one or more infrared (IR) type sensors that may be mounted about an interior of a vehicle or other space. In one embodiment, the gesture control system 100 can contain multiple types of visual sensors 104. The visual sensors 104 can be coupled to a vehicle to view the passenger compartment of the vehicle. In one embodiment, multiple visual sensors 104 can be positioned to observe separate portions or areas of the passenger compartment of the vehicle. The visual sensors 104 can be positioned to view both the drivers area and the passenger area. The visual sensors 104 can also be positioned to view the rear passenger area of the vehicle. In one embodiment, the visual sensors 104 can be used to detect a gesture of a driver or other occupant in a vehicle.

The gesture control system 100 can also contain audio sensors 106. The audio sensors 106 can be mono or stereo microphones. The audio sensors 106 can also contain noise cancellation or active noise reduction (ANR) technology to filter road and engine noise. In one embodiment, the audio sensors 106 can be located inside the passenger compartment of a vehicle. In one embodiment, the audio sensors 106 can be located inside the passenger compartment of a vehicle and can be used to detect an audio command of a driver or other occupant of a vehicle.

The gesture control system 100 can also contain telemetry sensors 108. Non-limiting examples of telemetry sensors 108 can include weather sensors, such as temperature or humidity sensors. The telemetry sensors 108 can also include traffic condition sensors. Telemetry sensors 108 can also include accelerometers or other sensors configured to measure a configuration, attitude, position, speed, velocity, orientation, and the like. In one embodiment, a vehicle can include multiple telemetry sensors of varying types as required. Additionally, the gesture control system 100 can also contain separate environmental sensors 110. Non-limiting examples of environmental sensors 110 can include illumination sensors, wind sensors, or other environmental sensors 110 configured to measure one or more environmental conditions either outside or inside the vehicle.

The gesture control system 100 can also contain supplementary sensors 112 as needed. Non-limiting examples of supplementary sensors can include pressure sensors, bio-metric sensors, voltage sensors, current sensors, etc. The supplementary sensors 112 can be used to supplement the other sensors of the gesture control system 100 by providing more detailed information where needed.

The processor 102 of the gesture control system 100 can also be coupled to a communication module 114. The communication module 114 can be used to interface the gesture control system 100 with a cellular phone or other mobile communication device. The communication module 114 can also be used to communicate with other external devices or networks. In one embodiment, the communication module 114 can include a BLUETOOTH communication system for communicating with cellular phones or other portable electronic devices. The communication module 114 can also communicate with external cellular networks such as those operating using LTE, 4G, 3G or other cellular communication protocols as are known in the art. The communication module 114 can also be equipped to operate using a Wi-Fi connection such as IEEE 802.11-type networks. Additionally, the communication module 114 can also be capable of receiving information from Global Positioning Satellites ("GPS"). Positional information can be received via the GPS by the communication module 114.

The processor 102 of the gesture control system 100 can also be coupled directly to the vehicle via a vehicle interface module 116. The vehicle interface module 116 can allow the gesture control system 100 to have access to vehicle information such as speed, rpm, engine temp, etc. Furthermore, the vehicle interface module 116 can allow for communication between all of the vehicle systems and the gesture control system 100. Non-limiting examples include communication with the infotainment system, the climate control system, power windows, power locks, internal lighting, or other system as is known in the art. Additionally, via the vehicle interface module 116, the gesture control system 100 may be able to control certain systems of the vehicle such as infotainment, climate control and other systems. In some embodiments, the gesture control system 100 can be limited to only controlling those vehicle systems that do not affect the safety of operating the vehicle, but may be extended to safety related features as well. The vehicle interface module 116 can communicate with the vehicle via an industry standard communication protocol such as CAN or CAN Open. Alternatively, the vehicle interface module 116 can communicate with the vehicle via any communication protocol as is known in the art.

The processor 102 of the gesture control system 100 can also be coupled to a memory device 118. The memory device 118 can store information related to gesture control zones 120, occupant locations 122, physical elements 124, extracted features 126, and prior knowledge 128. Additionally, the memory device 118 can be configured to store additional information and/or data as required to operate the gesture control system 100.

As presented below, various examples and embodiments of the present gesture control system 100 are illustrated describing the system 100 being used in a vehicular application. While examples are presented relating to a vehicular application, the teachings described herein may apply easily in other settings, such as, for example, use of the gesture control system 100 in other vehicle types including motorcycles, golf-carts or other open air-vehicles, aircraft, trains, boats, submarines, space shuttles, military vehicles, and the like. Further it will be apparent that the gesture control system 100 may be utilized in conjunction with other non-vehicular applications, such as a multimedia settings (e.g., a home theater, a computer, etc.), home automation systems, individual room automation systems, or other settings. For example, the gesture control system 100 may use visual sensors 104 located in a living room of a home to allow an occupant to control various aspects of a home automation system using gesture controls.

Additionally, the terms "occupant," "passenger," and "driver," are used to describe users of the gesture control system 100, and should not be interpreted to restrict the scope of system user to those found in a vehicular application. Rather, users can be occupants of vehicles, occupants of rooms or homes or other fixed structures, or, in general, any spaces or volumes, etc.

Figure 2:
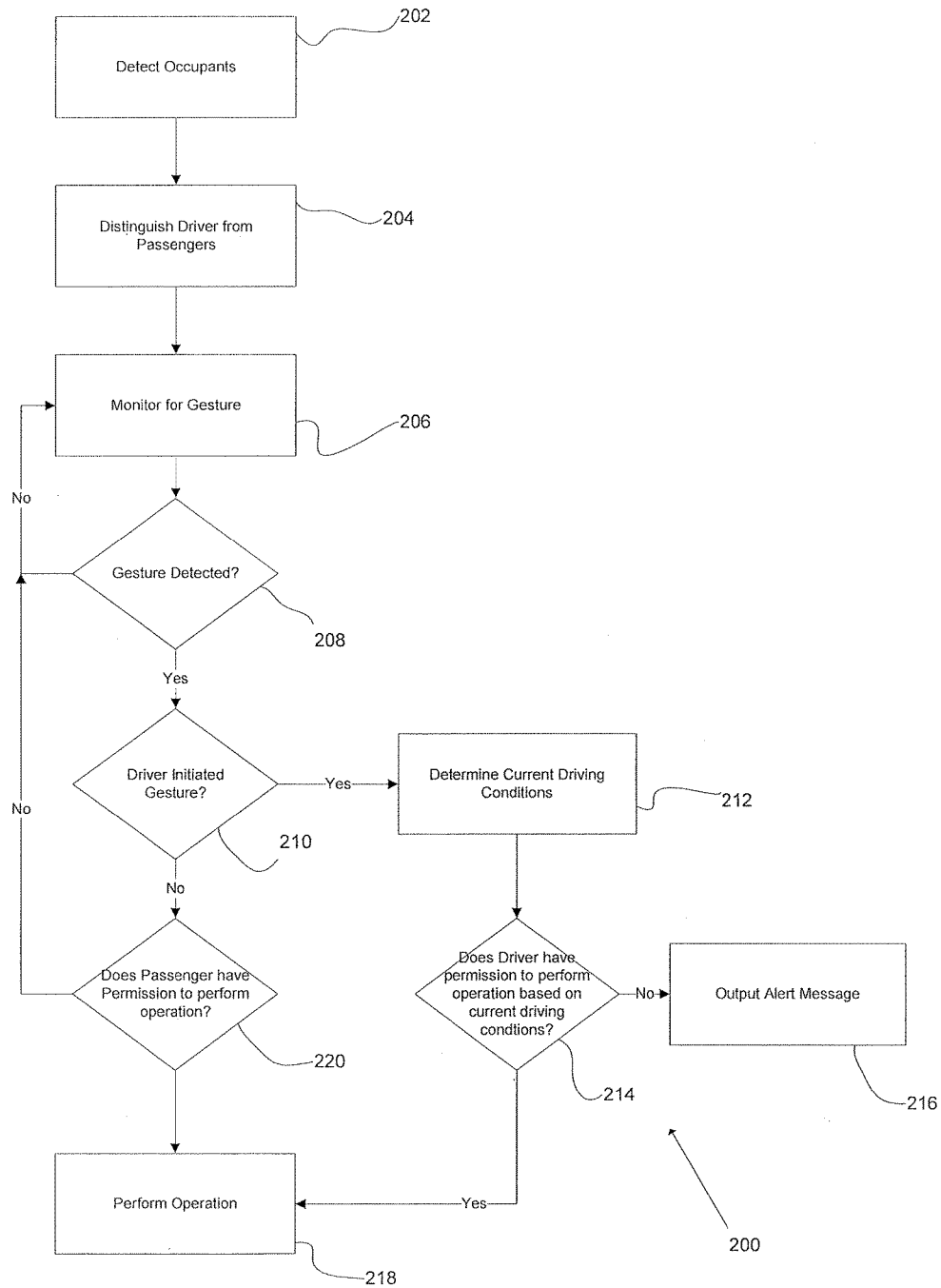
FIG. 2 is a flowchart depicting an embodiment of a multi-user gesture control process.

Turning now to FIG. 2, an embodiment of multi-user gesture control process 200 can be seen. In one embodiment, the multi-user gesture control process 200 is always active. The multi-user gesture control process 200 can allow the gesture control system 100 to recognize occupants in a vehicle. The multi-user gesture control process 200 can also allow the gesture control system 100 to detect and interpret gestures made by occupants of the vehicle. At process block 202, the multi-user gesture control process can detect occupants present in the vehicle. The multi-user gesture control process 200 can detect occupants in the vehicle via the plurality of sensors in the gesture control system 100. In one embodiment, the multi-user gesture control process 200 can detect the presence of occupants in the vehicle using the visual sensors 104. The multi-user gesture control process 200 may also be able to detect the presence of occupants in a vehicle and identify the occupants using facial recognition technology by evaluating images captured by the visual sensors 104. Alternatively, the multi-user gesture control process 200 can detect the presence of occupants in the vehicle using supplemental sensors 112, such as pressure sensors to detect the presence of an occupant in a seat. Supplemental sensors 112 such as biometric sensors can also be used to detect the presence of occupants in the vehicle.

At process block 204, multi-user gesture control process 200 can distinguish the driver of the vehicle from other occupants (i.e. passengers) detected in the vehicle. Methods for distinguishing the driver from other passengers of the vehicle will be discussed in more detail below. Once the driver has been distinguished from other occupants, the multi-user gesture control process 200, at process block 206, can begin monitoring for gestures presented by occupants of the vehicle. If a gesture is detected at process block 208, the multi-user gesture control process 200 can proceed to process block 210 where the multi-user gesture control process 200 can determine if the gesture was a driver initiated gesture. The multi-user gesture control process 200, having determined that the detected gesture was a driver initiated gesture, can then proceed to evaluate the current driving conditions at process block 212. Non-limiting examples of driving conditions can be the speed at which the vehicle is traveling, engine speed, current gear, whether the vehicle's hazard lights are operational, time of day, weather conditions, vehicle location, etc. Driving conditions such as vehicle location and vehicle speed can be determined via the telemetry sensors 108 and/or communication module 114. Driving conditions such as weather conditions can be determined via the environmental sensors 110. Further, additional relevant driving condition can be evaluated by the multi-user gesture control process 200 as needed.

The multi-user gesture control process 200, at process block 214, can determine whether the driver has permission to perform the operation associated with the detected gesture based on the evaluated driving conditions. The multi-user gesture control process 200, determining that the driver does not have permission to perform the operation associated with the detected gesture, can generate an output alert message at process block 216. The output alert message can be an audio message informing the driver that they do not currently have permission to perform that operation. Alternatively, the output alert message can be visually presented to the user via a display visible to the driver. The output alert message can also be presented to the driver visually and via audio.

The multi-user gesture control process 200 can determine whether or not a driver has permission to perform an operation by comparing the desired operation against the evaluated driving conditions. The gesture control system 100 can be programmed with certain rules regarding the availability of certain operations to a driver in light of the current evaluated driving conditions. In one embodiment, the rules can be programmed into the gesture control system 100 during the manufacturing process. Alternatively, all or a subset of the rules can be programmed by the vehicle owner using a set-up process.

In one example, the multi-user gesture control process 200 can detect a gesture from the driver indicating that the driver is attempting to access a message received via a mobile device, such as an SMS message. The multi-user gesture control process 200, determining that the car is in motion, can determine that the driver does not have permission to access the text message, as the vehicle is in motion and the driver could be distracted by the message. Alternatively, the multi-user gesture control process 200, detecting a gesture by the driver indicating the desire to access a message, can determine that the vehicle is currently in operation by determining via the vehicle control system that the transmission is in the "drive" condition. The multi-user gesture control process 200 can then prevent the driver from accessing or responding to the message. In conjunction with preventing the driver from accessing the message, the multi-user gesture control process 200 can also present the user with an alert message. The alert message can inform the driver that the desired operation cannot be performed at the present time. The alert message can also provide the driver with instructions or further information regarding the desired operation. For example, informing the driver that the operation can be performed when the vehicle is stopped and/or the transmission is put into the "park" condition.

Alternatively, the gesture control process 200, determining that the desired action is not allowed based on the current driving conditions, can alert the driver that the action is not allowed based on the current driving conditions, and provide an alternate operation. For example, where the driver receives an SMS text message while the vehicle is in motion, the alert message can inform the driver that the driver cannot access the message while the vehicle is in motion, but may provide the driver with an option to have the message read to him where the vehicle is so equipped. Here the driver can access the content of the message, but will not be able to respond until the vehicle is stopped and/or the transmission is put into the "park" condition, for example. Alternatively, the gesture control process 200 can allow the user to respond to the message by verbally reciting a response. The verbal response can be captured by the audio sensors 106 of the gesture control system 100 and translated into text format by using a voice-to-text function. Further, the gesture control system 100 can alert the user that they do not have permission to perform the desired operation based on the status of the vehicle (i.e. moving). In one example, the gesture control system 100 can visually indicate that the driver does not have permission to perform the desired operation. Alternatively, the gesture control system 100 can audibly indicate that the driver does not have permission to perform the desired operation.

Returning to process block 214, if the multi-user gesture control process 200 determines that the driver has permission to perform the desired operation based on the current driving conditions, the multi-user gesture control process 200, at process block 218, can instruct the gesture control system 100 to perform the desired operation. The gesture control system 100 can initiate the desired operation via the vehicle interface module 116. Alternatively, the gesture control system 100 can also perform the desired operation via the communication module 114.

Again returning to process block 210, if the multi-user gesture control process 200 determines that gesture was not initiated by the driver, the multi-user gesture control process 200 can determine that the gesture was initiated by a passenger. The multi-user gesture control process 200, at process block 220, can then evaluate if the passenger has permission to perform the desired operation. In one embodiment, the passenger can have permission to perform any operation that the driver can request using the gesture control system 100. Additionally, the passenger may have permission to perform operations that the driver does not have permission to perform. As an example, the navigation system may not allow the driver to input a desired destination when the vehicle is in motion; however, a passenger, performing the same gesture, may have permission as it will not affect safety to have the passenger access the navigation system while the vehicle is in motion.

The driver can determine what permissions passengers will have. For example, a driver or other user can program the gesture control system 100 to disallow a passenger from being able to access the driver's text message using the gesture control system 100. In one embodiment, the passenger will not have permission to control safety related functions using the gesture control system 100. The multi-user gesture control process 200, determining that the passenger does have permission to perform the desired operation, can instruct the gesture control system 100 to perform the operation.

In one embodiment, the driver may be able to set permissions based on the particular passenger. For example, where the gesture control system 100 can identify occupants using facial recognition, the gesture control system 100 can be programmed to associate a specific permission level with each recognized occupant. Further, occupants who can't be recognized may be given a permission level associated with a "guest." The "guest" permission levels can be pre-programmed or established by the vehicle owner. Alternatively, the gesture control system 100, detecting a "guest," can present the driver with a query as to what type of permission level the "guest" occupant should have. The driver, can review possible options and quickly set the permission level associated with the unrecognized occupant. The ability to specify permissions for individual occupants can allow a driver to reduce the amount of access provided to children and unrecognized occupants. In one example, the gesture control system 100 can present the driver with "guest" occupant permission level queries when the vehicle is not in motion. Further, the gesture control system 100 can present the driver with "guest" occupant permission level queries only when the vehicle's transmission is in park. Alternatively, the driver can establish certain gestures that can allow the driver to quickly select a permission level presented by the gesture control system, in order to reduce distractions while driving.

Additionally, the driver may be able to control or modify permission levels during vehicle operation where it may be required to allow an unrecognized occupant to perform a specific feature, or access certain information, that the unrecognized occupant does not have permission to perform or access. In this situation, the driver may be able to initiate a gesture command granting temporary access to the unrecognized occupant. As noted above, the ability of the driver to control or modify permission levels may be restricted where the vehicle is in motion. While the above embodiment discloses using facial recognition to identify an occupant, alternative methods of identifying occupants could also be used, such as biometric data obtained from the supplementary sensors 112 or voice data obtained from the audio sensors 106. Further, the gesture control system 100 may be able to identify occupants based on information contained on their mobile devices. For example, the gesture control system 100 may be able to access content stored on an occupant's cellular phone or mobile device via the communication module 114. Additionally, it may be possible for the gesture control system 100 to identify occupants using a combination of methods (e.g., using data from the visual sensors 104 and the communication module 114).

A driver may also be able to increase or decrease permission available to a recognized occupant as well where the situation requires. For example, a driver may have permissions set so that recognized children do not have permission to access infotainment information. However, in certain instances, the driver may wish to temporarily provide permission to access the infotainment information to the recognized children and can do so by initiating a gesture command temporarily granting the desired child permission to access infotainment information.

Where multiple passengers are present, the multi-user gesture control process 200 can assign different permissions based on the location of the passenger. For example, a passenger in the front seat area of the vehicle may have permission to control the navigation system, while a passenger seated in the rear seating area of the vehicle may not have permission to control the navigation system. The ability of the gesture control system 100 to assign different levels of control based on the location of the passenger will be discussed in more detail below.

Figure 3:
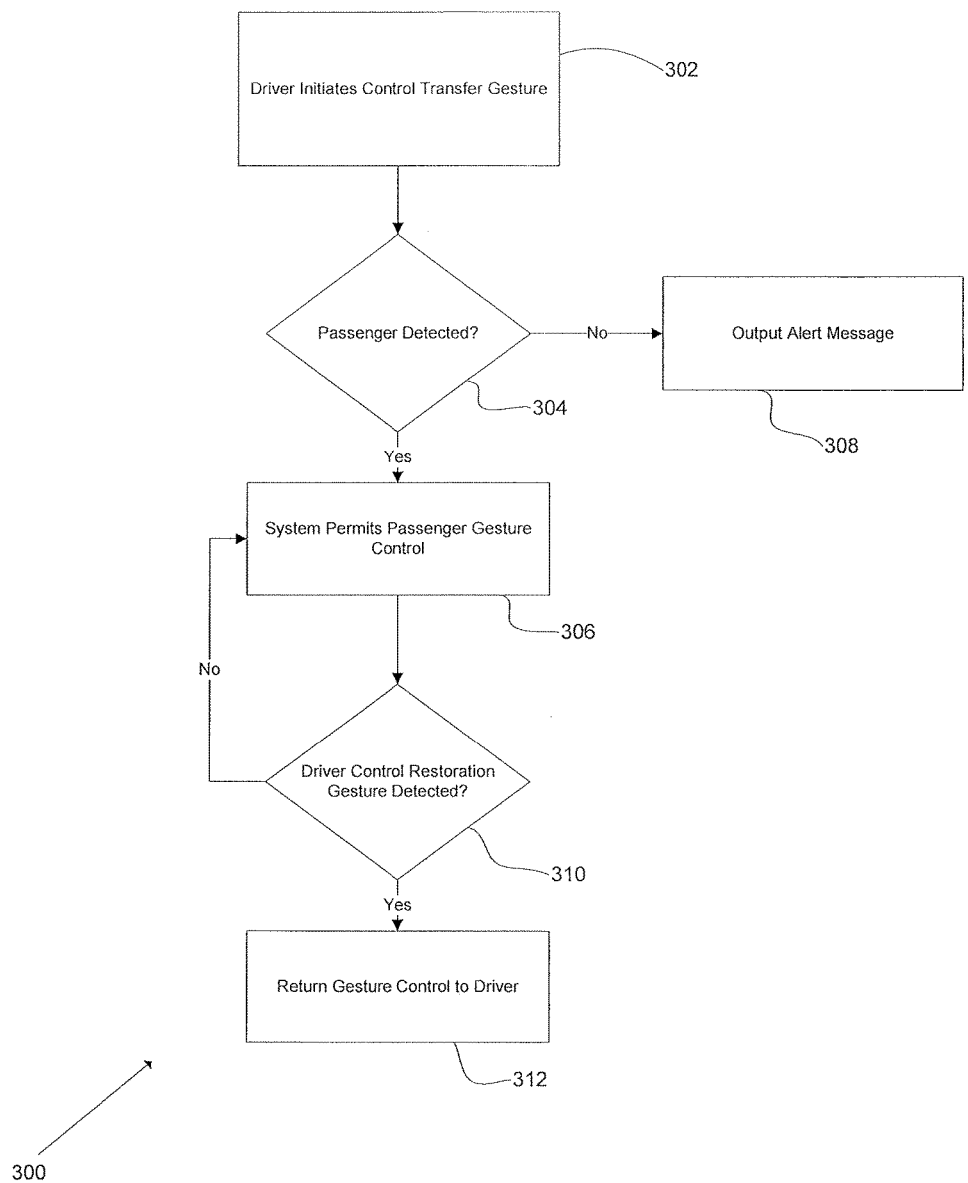
FIG. 3 is a flowchart depicting a gesture control transfer process.

FIG. 3 describes a gesture control transfer process 300. The gesture control transfer process 300 can be performed by the gesture control system 100. In one embodiment, the gesture control transfer process 300 can allow the driver to pass control of a particular operation to a passenger of the vehicle using the gesture control system 100. Alternatively, the gesture control transfer process 300 can allow a driver to pass control of the entire gesture control system 100 to a passenger. The gesture control process 300 can also allow a passenger to have access to manually input information into the vehicle systems, such as programming a destination into the navigation system. In addition to being able to pass or assign control, the gesture control transfer process 300 can also allow a driver to pass information or other content to a passenger.

At process block 302 the driver can initiate a control transfer gesture. In one embodiment, the control transfer gesture can be a pre-determined gesture. Alternatively, the control transfer gesture can be a user defined gesture. Further, the control transfer gesture can be a series or sequence of gestures combined to create a gesture password for passing control to a passenger. Still further, the control transfer gesture can be application or passenger specific. Where the control transfer gesture is application specific, the driver can transfer control to a passenger of a single application using a specific gesture. Where the control transfer gesture is passenger specific, the driver can transfer gesture control to a particular passenger located in the vehicle using a specific gesture. In one example, a specific gesture could be a voice command in combination with a physical motion such as pointing to a specific passenger. Alternatively, the specific gesture could be a combination of physical gestures, such as a series of hand gestures.

Passenger-specific and application-specific control transfer gestures can be pre-configured during the manufacturing process. Alternatively, the gesture passenger specific and application specific control transfer gestures can be programmed by the owner of the vehicle. In one embodiment, the gesture control system 100 may be able to learn the passenger specific and application specific control transfer gestures over a period of time.

The gesture control transfer process 300, upon a driver performing a control transfer gesture, can then determine at process block 304 if a passenger is located in the vehicle. The gesture control transfer process 300, having determined that a passenger is located in the vehicle, can proceed to process block 306 and transfer gesture control to the passenger. Conversely, the gesture control process 300, having determined that a passenger is not present in the vehicle, can present an alert message to the driver at process block 308. The alert message can be an audio or visual alert message. The alert message can inform the driver that control cannot be passed to a passenger as a passenger is not available to receive control. Additionally, the gesture control process 300 can be configured to restrict what gesture controls can be transferred to a passenger based on the properties associated with the passenger. For example, if the gesture control system 100 determines that a passenger is a child, the gesture controls that can be transferred may be limited. In one example, the gesture control process 300 can have pre-defined rules limiting the type of gesture controls that can be passed to certain passengers. Alternatively, the driver can define rules in the gesture control system 100 limiting the type of gesture controls that can be passed to certain passengers. Examples of properties of associated with a passenger can include, but are not limited to, weight, location, etc.

Turning now to process block 310, the gesture control transfer process 300 can continue to monitor for gestures from the driver. Specifically, the gesture control process 300 can monitor for a driver control restoration gesture. The driver can perform a driver control restoration gesture to remove control from the passenger and return control to the driver. The gesture control transfer process 300, not detecting a driver control restoration gesture, can continue to allow the passenger to retain control. The gesture control transfer process 300, detecting a driver control restoration gesture, can remove gesture control from the passenger and return gesture control to the driver at process block 312.

Figure 4:
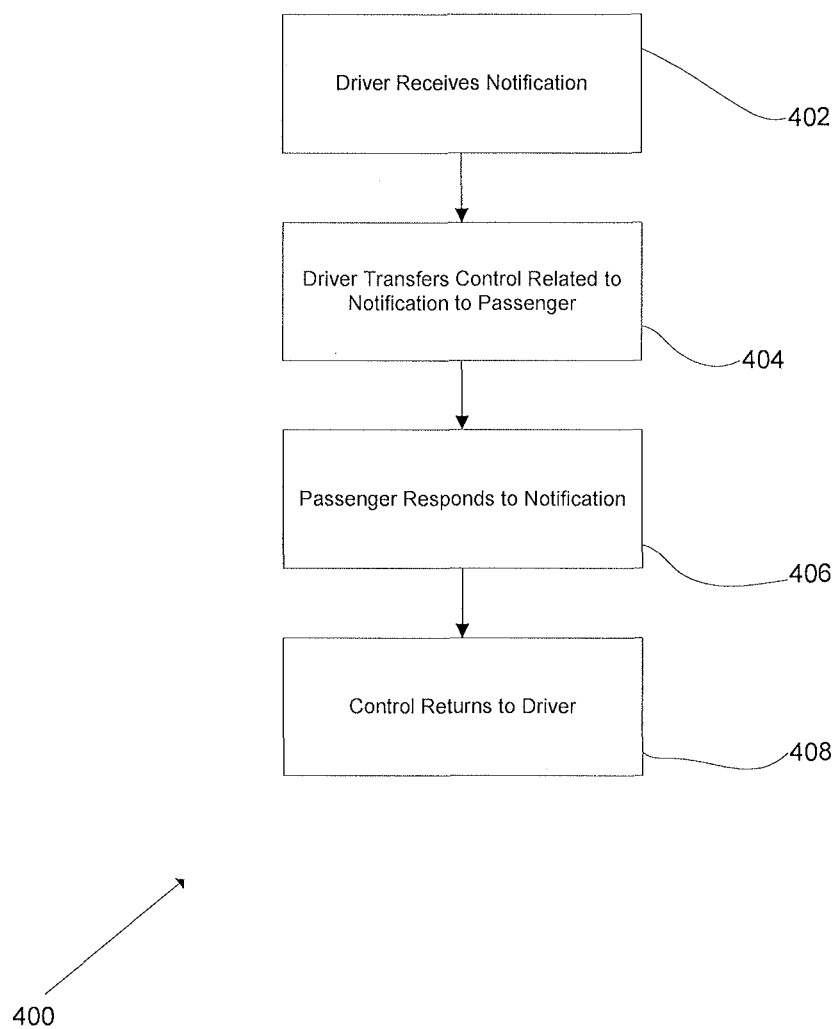
FIG. 4 is a flowchart depicting a single event control transfer process.

FIG. 4 illustrates a single event control transfer process 400. The single event control process 400 can be used by a driver to pass control of an operation to a passenger for a specific event. This can allow for a driver to permit a passenger to quickly respond to a particular event without having to transfer more control to a passenger than what is needed.

At process block 402, the driver can receive a notification from the gesture control system 100. The notification can be presented to the driver via an audio message delivered through the audio system in the vehicle. Alternatively, the notification can be presented to the driver visually, via a display in the vehicle. For example, the gesture control system 100 may notify the driver when the driver receives a message on a mobile device, such as an SMS message or an e-mail. Alternatively, the gesture control system 100 may present a notification to the driver when the driver tries to access a system to which the driver does not have access based on the current driving conditions. As an example, the driver may attempt to enter a destination into the navigation system while the vehicle is moving; however, this action may be prohibited by the gesture control system 100 where a driver is operating the vehicle. The gesture control system 100 can then notify the driver that the driver does not have permission to perform that operation. The notification can be provided to a driver for any event detected by the gesture control system 100.

The driver, having received the notification of an event from the gesture control system 100, can transfer control related to the event to the passenger at process block 404 using a specific gesture, as discussed above. The passenger, now having the ability to perform action required to respond to the event, can take action such as reading and responding to a message, inputting a destination into a navigation system, etc., at process block 406. The gesture control system 100 can then determine that the passenger has responded to the event, at which time the single event control transfer process 400 can return control to the driver at process block 408. In various embodiments, the control may transfer back to the driver after the passenger has responded, remain with the passenger until the passenger transfers control back to the driver, or transfer when a predetermined timer has expired. Additionally, it is possible for the driver to transfer control to the passenger for a particular class of notifications or other categories of gestures until control is returned, a predetermined time has expired, or until the status of the automobile changes (i.e., the automobile is placed in "park", etc.).

In one example of a single event control transfer process, the driver can receive an SMS message via a mobile device. The gesture control system 100 can detect the SMS message via the communication module 114 and present the driver with a notification of the SMS message. The driver can then decide to transfer control of the message response to a passenger. In an exemplary embodiment, the driver can transfer control of the message response to the passenger by performing a "swiping" gesture to transfer control of the message over to the passenger. "Swiping" is known to mean using a translational movement, typically in a left-to-right, or right-to-left motion, to perform an action. The driver can swipe in the air using his hands or fingers which can be detected and interpreted by the visual sensors 104 of the gesture control system 100. Alternatively, the driver may "swipe" the message to the passenger using a user interface, such as a touch controller. The passenger, having received control to respond to the message, can respond to the SMS message received by the driver. Once the response is complete, control can return to the driver. Responding to an SMS message is only one example of a single event transfer process 400 implementation.

Figure 5:
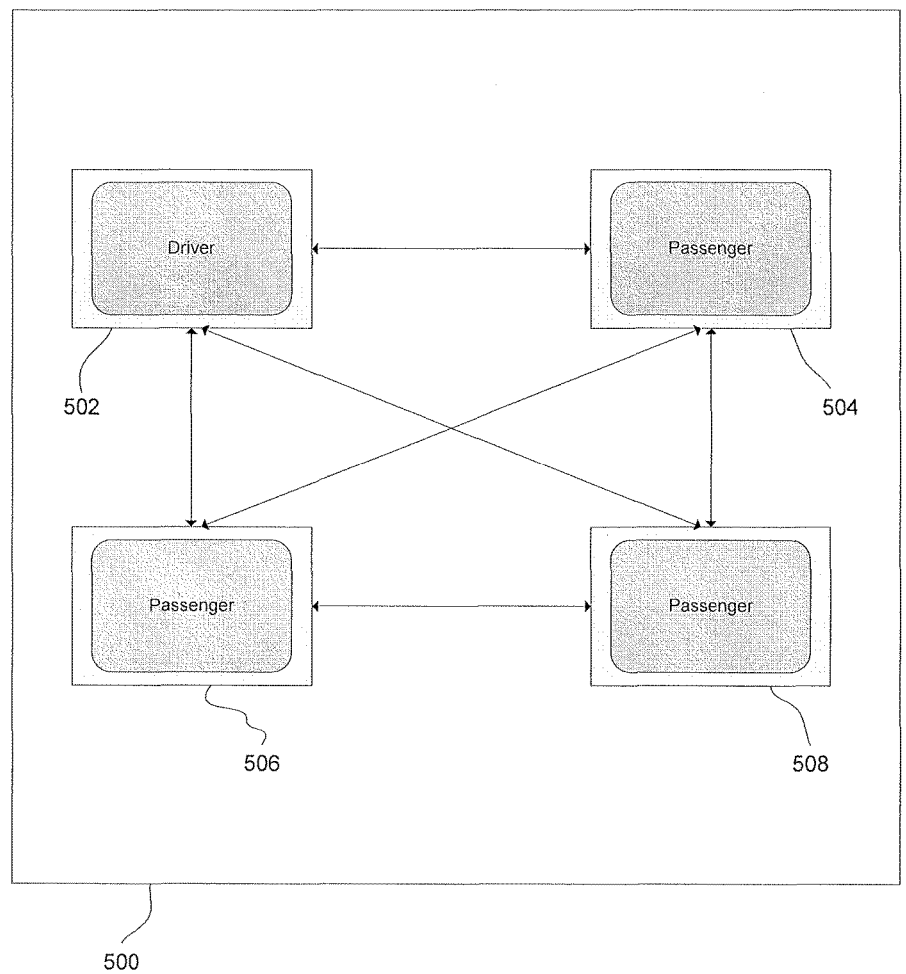
FIG. 5 depicts a vehicle distributed control system.

Turning now to FIG. 5, a representation of a distributed control system 500 in a vehicle can be seen. The distributed control system 500 can include a plurality of control screens 502, 504, 506, 508. The control screens 502, 504, 506, 508 can provide a user with access to various functions provided by the vehicle. The functions provided can include infotainment control, climate control, navigation control, communications via mobile devices, and network access. However, any functionality provided by the vehicle can be potentially accessed by the control screens 502, 504, 506, 508. The control screens 502, 504, 506, 508 can be integrated into the cockpit. The control screens 502, 504, 506, 508 can also be integrated into a mobile device. Further, the control screens 502, 504, 506, 508 can be both integrated into the vehicle as well as integrated into mobile devices. Integrating control screens 502, 504, 506, 508 into mobile devices can allow for a user to interface with the gesture control system 100 remotely. While the present example discloses four control screens, it should be known that the present technology contemplates vehicle systems with more or less than four control screens.

In one embodiment, the driver can have a dedicated screen 502. The driver control screen 502 can act as a master controller, determining the level of access available to the passenger control screens 504, 506, 508. It may be possible for the driver to provide content from the driver control screen 502 to the passenger control screens 504, 506, 508 using a gesture. As an example, the driver can perform a gesture that passes control or information from the driver control screen 502 to the passenger control screen 504. This gesture can be a swiping gesture or any other type of gesture recognized by the gesture control system 100. Alternatively, the driver can perform a gesture that passes control or information from the driver control screen 502 to the passenger screens 506, 508. The driver can transfer information or control to passenger control screens 504, 506, 508 individually or as a group. Alternatively, the driver can perform a gesture that relinquishes control to any passenger. A passenger, once the driver has relinquished control, can perform a specific gesture command to obtain control over the specific control or information relinquished by the driver.

Alternatively, the gesture control system 100 can allow for passengers to pass control or information between passenger control screens 504, 506, 508 using a gesture. Further, the gesture control system 100 can allow for passengers to pass control or information from passenger control screens 504, 506, 508 to the driver control screen 502 using a gesture.

Figure 6:
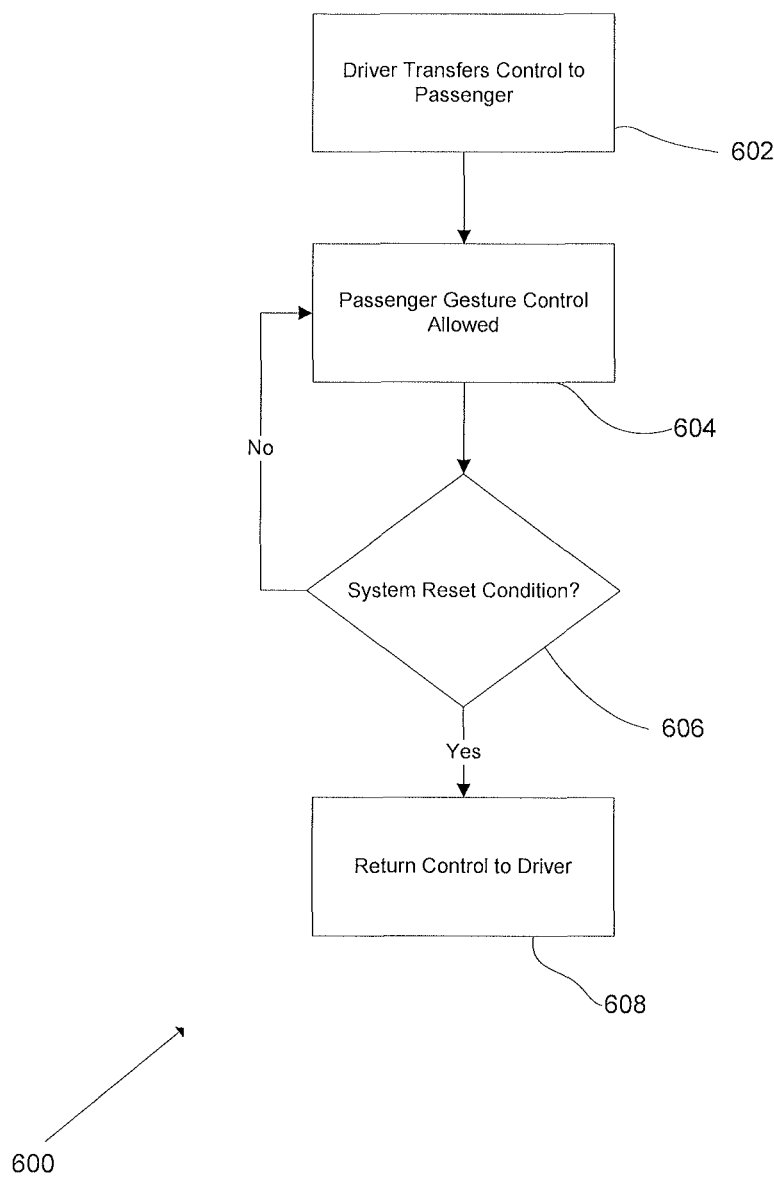
FIG. 6 is a flowchart depicting a control reset process.

FIG. 6 illustrates a control reset process 600. The control reset process 600 can be used to return control from a passenger to a driver. In process block 602, the driver can transfer control of an action to a passenger in the vehicle. The gesture control system 100 can then provide the passenger with control at process block 604. After the passenger has been granted control, the control reset process 600, at process block 606, can monitor to determine if a system reset condition has been triggered. A system reset condition can be triggered by a pre-determined time period expiring. The pre-determined time period can be initiated once the control is passed to a passenger. In one embodiment, the pre-determined time period can be a period of inactivity by the passenger after control has been transferred to the passenger. The pre-determined time period can be programmed during the manufacturing process. Alternatively, the pre-determined time period can be programmed by a user. In one embodiment, the pre-determined time period can be about 30 seconds to about 60 seconds, or more or less. The control reset process 600, determining that a system reset condition has been triggered can return control to the driver at process block 608.

Figure 7:
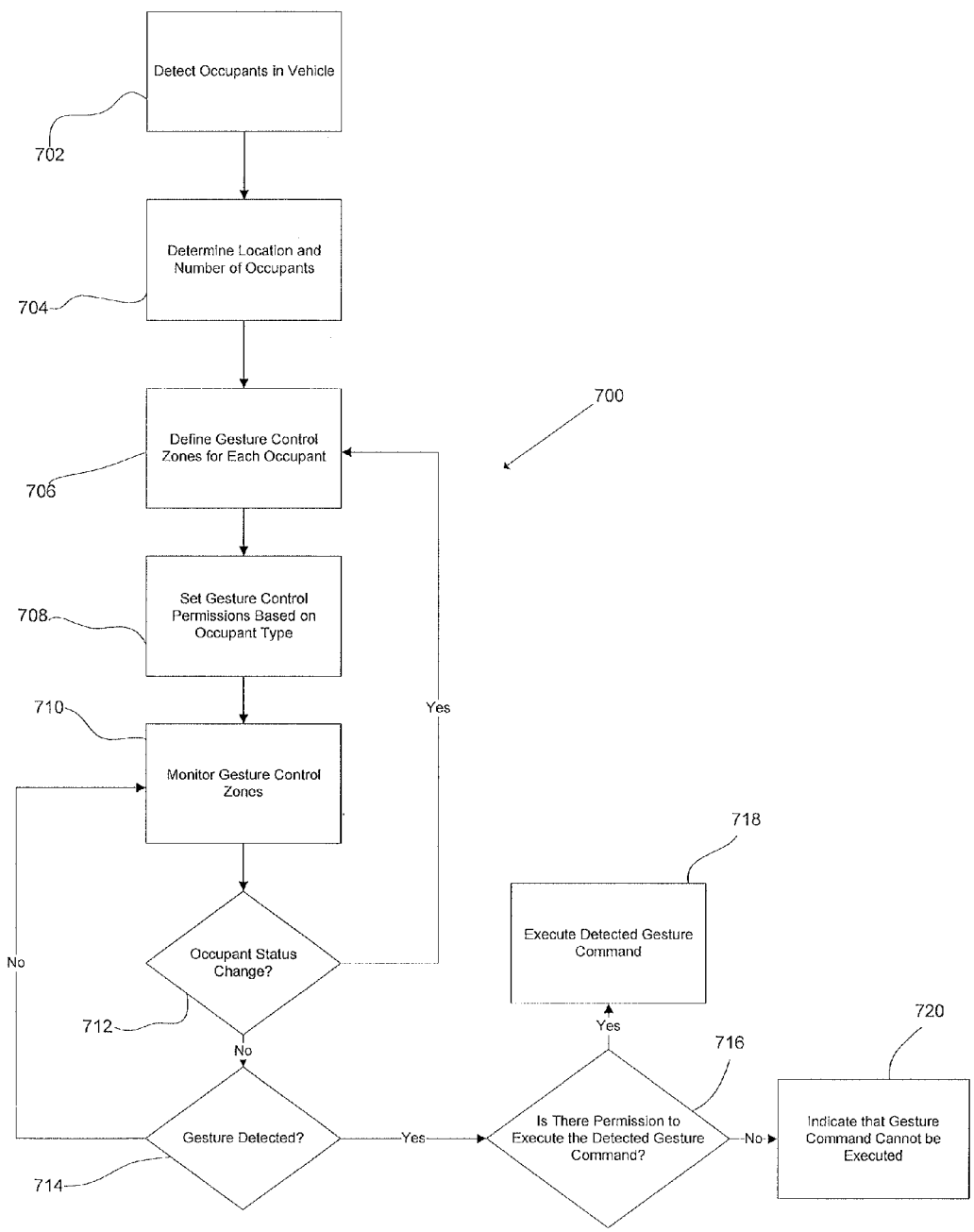
FIG. 7 is a flowchart depicting a zone designation process.

Turning now to FIG. 7, an illustration of a zone designation process 700 can be seen. A gesture control system 100 can recognize gestures within given zones. A zone can be a specific area within the field of view of a sensing device, such as a visual sensor 104, that is associated with a given occupant. The zone can be either a two-dimensional area or a three-dimensional area. The zone is associated with a particular occupant and can be used to determine which occupant is performing a control gesture. A gesture control system 100 using zones can allow for better differentiation between occupants, as the gesture control system 100 is not required to monitor only areas proximate to control surfaces. A zone based gesture control system 100 can focus on recognizing gestures presented by occupants that are more ergonomic as the occupant can perform the gesture naturally within their respective individual zone, without having to reach towards a specific device. Additionally, where a gesture control system 100 monitors only an area proximate to control surfaces, such as a control screen, it can be difficult to distinguish whether it is the driver's hand or a passenger's hand.

At process block 702, the gesture control system 100 can detect the presence of occupants in the vehicle. Occupants can include both drivers and passengers. Once the gesture control system 100 has detected occupants in the vehicle, the location and number of occupants can be determined at process block 704. The location and number of occupants can be determined by the gesture control system 100. The gesture control system 100 can determine the location and number of passengers using the plurality of sensors. For example, the gesture control system 100 may use visual sensors 104 to determine the location and number of passengers. However, the gesture control system 100 may also use supplementary sensors 112 such as pressure sensors or biometric sensors.

Figure 8:
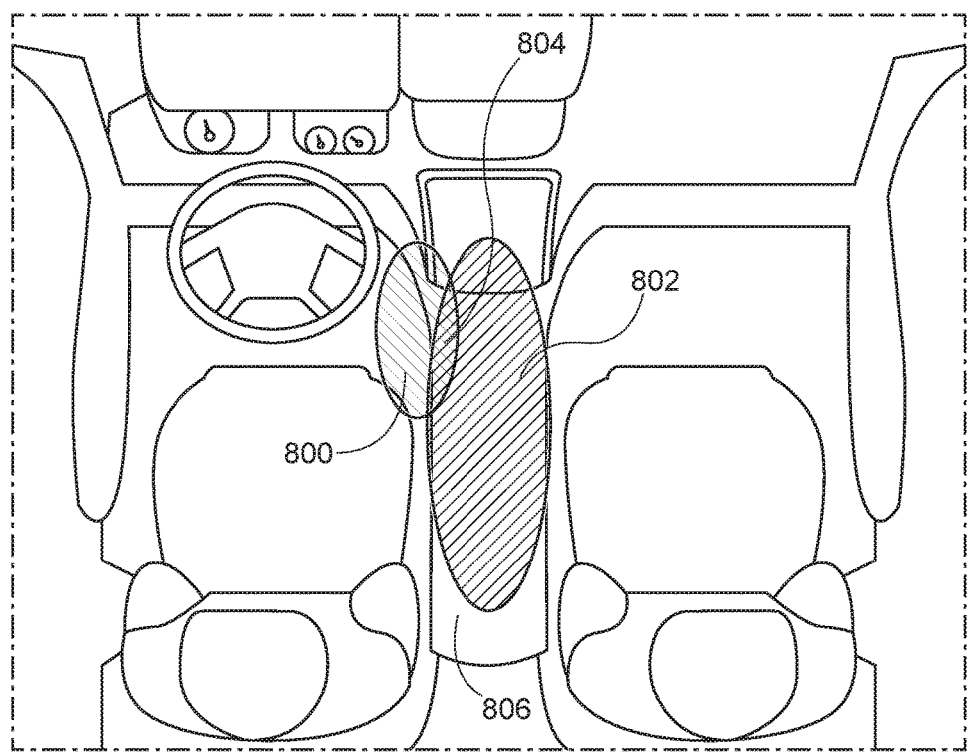
FIG. 8 depicts an example of segmented driver and passenger gesture control zones within a vehicle cabin.

At process block 706, the zone designation process 700 can define gesture control zones 120 for each occupant. The gesture control zones 120 can be stored in memory device 118 of the gesture control system 100. Turning briefly to FIG. 8, an example of multiple gesture control zones 120 can be seen. In this example, a driver gesture control zone 800 can be located to the right of the driver. Alternatively, a passenger gesture control zone 802 can be located to the left of the passenger. As shown in FIG. 8, driver zone 800 and passenger zone 802 can be indicative of where the driver and passenger may naturally position their hands while making gestures within the vehicle. While the example in FIG. 7 shows only two gesture control zones 800, 802, it should be understood that one or more gesture control zones 120 could be established for each occupant in the vehicle. For a given system, the typical locations of occupants as well as areas in which those occupants perform gestures can be used to define gesture control zones 120. In one embodiment, the zone designation process 700 can define gesture control zones 800, 802 based on the position of the occupants in the vehicle. Alternatively, the zone designation process 700 can define gesture control zones 800, 802 using pre-defined zones for each detected occupant. The pre-defined zones can be programmed into the gesture control system 100 during the manufacturing process. Alternatively, the pre-defined zones may also be able to be learned by the gesture control system 100 during an initial set-up process.

The gesture control system 100 can further define gesture control zones 120 using historical data stored in the memory device 118. The historical data stored in the memory device 118 can be used by the gesture control system 100 to learn how to define gesture control zones 120 over time. Further, where the gesture control system 100 is capable of recognizing an occupant, the gesture control system 100 can further define gesture control zones 120 based on each recognized occupant in the vehicle. For example, one occupant may generally be positioned closer to, or further away from the visual sensor 104 than another occupant. The gesture control system can store the positions of occupant in the memory device 118 as historical knowledge and analyze the historical knowledge to identify an occupant specific gesture control zone 120. The gesture control system 100, recognizing a particular occupant, can monitor the gesture control zone 120 associated with the recognized occupant.

Further, when multiple gesture control zones 120 are defined, either pre-defined, or based on position or recognition of occupants, the gesture control system 100 can dynamically adjust the gesture control zones 120 where certain conditions change. For example, where only one occupant is detected, the gesture control zone 120 may be defined to cover a large area encompassing that single occupant. When a second occupant is detected in close proximity to the first occupant, the gesture control zone 120 for the first occupant may be adjusted by reducing the area of the gesture control zone 120 to minimize any overlap with the gesture control zone 120 for the second occupant.

Returning now to FIG. 7, once the gesture control zones 120 have been established, the zone designation process 700, at process block 708 can set gesture control permissions based on the particular occupant for each gesture control zone 120. In one embodiment, each particular occupant can be associated with an occupant type. For example, occupant types can include a driver and one or more passenger. Occupant types can also be between types of passengers, such as front seat passengers and back seat passengers. Thus, gestures made inside the driver gesture control zone 800 may have greater permission to access vehicle functions than a gesture made inside the passenger gesture control zone 802. The permissions can be pre-determined during the manufacturing process. Alternatively, the driver can set the permissions for the passenger gesture control zones 802. However, where permissions are based on separate gesture control zones 120, the gesture control system 100 may be unable to distinguish between users performing a control gesture in a given gesture control zone 120. For example, where a driver gesture control zone 800 has a first permission level, and a passenger gesture control zone 802 has a second, more restrictive permission level, it may be possible for the passenger to execute a desired gesture command by performing the gesture command in the driver gesture control zone 800. Alternatively, a driver may not have permission to perform certain gesture control commands based on the operational status of the vehicle, as discussed above. While occupant types are discussed above as being related to drivers and passengers of a vehicle, occupant types can be used to distinguish between any users of the gesture control system 100.

Once the gesture control zones 120 have been established, the zone designation process 700 can instruct the gesture control system 100 to monitor for gestures made by vehicle occupants at process block 710. Further, at process block 710, the gesture control system 100 can monitor for a change in occupant status. A change in occupant status could result where an occupant enters or leaves the vehicle. Alternatively, a change in occupant status could result when an occupant changes their location within the vehicle. Such as when an occupant moves from the right rear seating location to the left rear seating location. If an occupant status change is detected at process block 712, the zone designation process 700 can, at process block 706, reconfigure the gesture control zones 120 based on the change in occupant status. As an example, if an occupant leaves the vehicle, the zone designation process 700 can eliminate the gesture control zone 120 that was associated with that occupant. Alternatively, if an occupant changes locations within the vehicle, the zone designation process 700 can eliminate the previous gesture control zone 120 that was associated with the occupant and subsequently define a new gesture control zone 120 based on the new location of the occupant.

At process block 714, the zone designation process 700 can determine if a gesture has been detected. If a gesture has been detected, the zone designation process 700 can proceed to process block 716 to determine if there is a permission to execute the desired gesture command. To determine whether there is sufficient permission to execute the desired gesture command, the zone designation process 700 can first determine what permission level is associated with the detected gesture command. The zone designation process 700 can then compare the permission level associated with the detected gesture command to the gesture control permissions of the gesture control zone 120 where the gesture command was detected. Where the zone designation process 700 determines that there is permission to execute the desired gesture command, the zone designation process 700 can execute the desired gesture command at process block 718.

The zone designation process 700 determining that there is not permission to execute the desired gesture command in the gesture control zone 120 where the gesture was detected, can indicate that the gesture command cannot be executed at process block 720. In one embodiment, the zone designation process 700 can instruct the gesture control system 100 to present an audio indication to the occupant indicating that the occupant does not have permission to perform the detected gesture command. The zone designation process 700 can also instruct the gesture control system 100 to present an visual indication to the occupant indicating that the occupant does not have permission to perform the detected gesture command. Alternatively, the gesture control system 100 can inform a separate occupant, such as a driver, that does have permission to execute the detected gesture command, such as a driver of a vehicle, that an occupant is attempting to execute a gesture command that the occupant does not have permission to execute. In one embodiment, the occupant that does have permission to perform the detected gesture command can be presented with an option to allow the detected gesture command to be executed. The occupant that does have permission to perform the gesture command can then allow the execution of the detected gesture command to occur. Alternatively, the zone designation process 700 can simply ignore any gesture command detected in a gesture control zone 120 that does not have permission to execute the detected gesture command.

Figure 9:
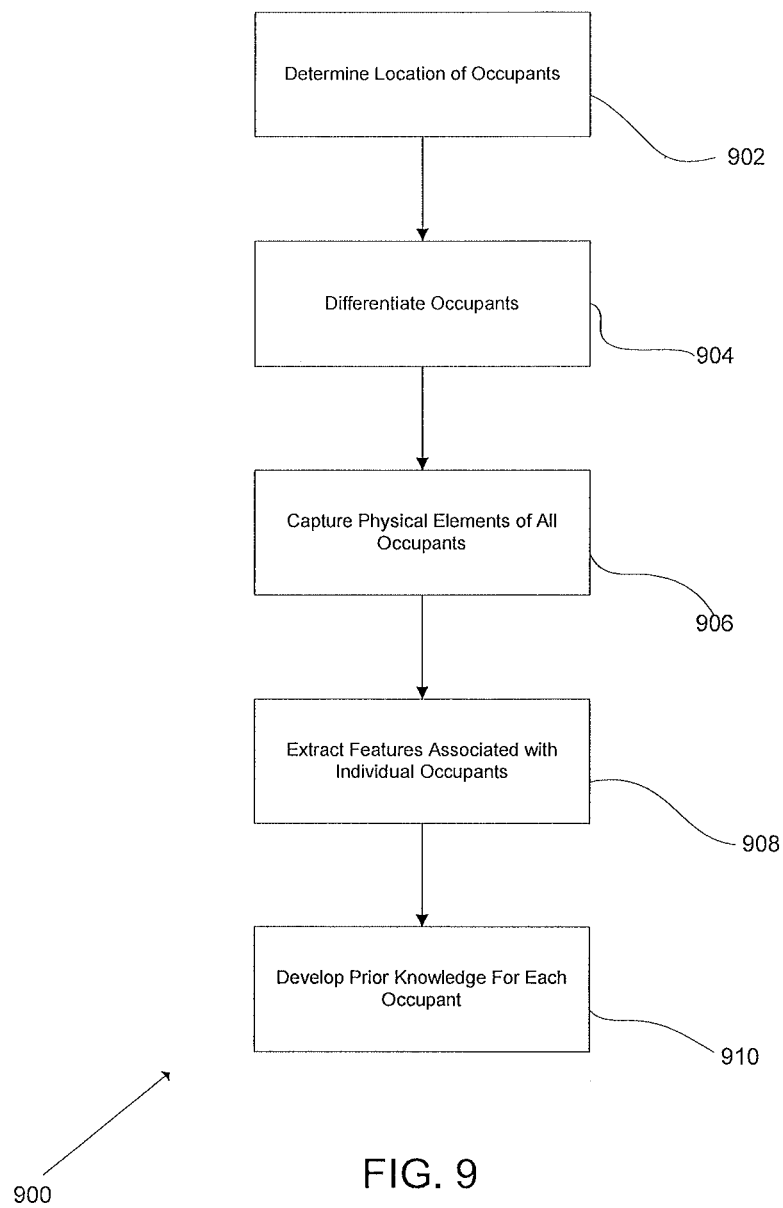
FIG. 9 is a flowchart depicting an embodiment of an occupant differentiation process.

Turning now to FIG. 9, an occupant differentiation process 900 can be seen. The occupant differentiation process 900 can provide an alternate process for differentiating between vehicle occupants. The occupant differentiation process 900 can provide for a finer distinction between occupants than a zone designation process 700 by monitoring the occupants themselves rather than a particular zone. In some cases, this approach can be beneficial as the zones in which occupants execute particular gestures may, in reality, overlap. This ability to distinguish between users in an overlapping zone, discussed below, illustrates a distinction over previous zone based gesture systems. To illustrate, an overlapping gesture control zone 804 can be seen in FIG. 8. Thus, where there is an overlapping gesture control zone 804, both driver and passenger may engage the system starting from the arm rest area 806. In this scenario, it can be difficult for the gesture control system 100 to distinguish the driver from the passenger without additional knowledge as to where an occupant's arm is originating from. The occupant differentiation process 900 can add additional certainty to the gesture recognition process by gathering data about the occupants as described below.

At process block 902 the gesture control system 100 can determine the location 122 of occupants within the vehicle. The gesture control system 100, having determined the location 122 of the occupants within the vehicle, can store the occupant location 122 in the memory device 118. The occupant differentiation process 900 can then, at process block 904, differentiate the driver from the passenger in the vehicle. In one embodiment, the occupant differentiation process 900 can differentiate the driver from passenger based on the location 122 of the occupants. Alternatively, the occupant differentiation process can differentiate the driver from a passenger based on other information provided by the gesture control system 100. For example, the driver and passenger may be separately clustered in the field-of-view of the visual sensor 104. Specifically, pixels belonging to the driver can be grouped separately from the pixels belonging to the passenger. Additionally, the pixels related to limbs of the driver can be distinguished from the pixels related to the limbs of a passenger, providing greater granularity in the distinction between driver and passenger. The occupant differentiation process 900 can then differentiate the occupants based on the separation of the pixel groups.

Once the driver and the passenger have been differentiated, at process block 906, the occupant differentiation process 900 can capture physical elements 124 associated with the driver and the passenger. In one embodiment, the physical elements 124 can be captured using the visual sensor 104 of the gesture control system 100. Alternatively, other sensors of the plurality of sensors of the gesture control system 100 can be used to capture the physical elements 124 of the occupants. The physical elements 124 can be a group of pixels associated with an occupant captured by the visual sensor 104. Further examples of physical elements 124 can be the weight of an occupant which may be captured by the supplemental sensors 112. Additionally, a physical element 124 can be an audio signature associated with an occupants voice that is captured by the audio sensors 106. Alternatively, the physical elements 124 can be any other physical characteristic capable of being captured by the gesture control system 100.

At process block 908, once the physical elements 124 associated with the driver and passenger have been captured, the physical elements 124 can be analyzed to extract features 126 associated with the driver and the passenger. The extracted features 126 can be stored in the memory device 118 of the gesture control system 100. The extracted features 126 can be the limbs of an occupant, such as an arm or a head. Alternatively, the extracted features 126 can be a particular movement of an occupant. Additionally, the features 126 can be any distinguishing characteristic that can be extracted from the captured physical elements 124.

In a preferred embodiment, as the limbs of the driver and passenger engage the gesture control system 100, the gesture control system 100 can extract a feature 126 comprising the shape of the hands of the driver and the passenger. The features 126 of the driver and passenger hands can be extracted and utilized by the gesture control system 100 to identify when a hand of a particular occupant is engaging the system. This can provide for greater accuracy than a location or zone based gesture identification system by associating a particular gesture based on the actions of a user, not the performance of a gesture within a certain zone or location.

At process block 910, the extracted features 126 can be captured and stored to develop a prior knowledge 128. The prior knowledge 128 can be stored in the memory device 118 and may contain a record or history of previously-extracted features. As such, the prior knowledge 128 can operate to store a history of movements or gestures (or partial gestures) that have been detected by the gesture control system 100 within the vehicle. As such, prior knowledge 128 can provide the gesture recognition system 100 with information regarding when and where the driver or passenger initially engaged (i.e., was detected by) the gesture control system 100. The gesture control system 100, having prior knowledge 128 as to the origin of the gesture, can differentiate the gesture even where there is an overlap between the passenger and the driver. Thus, even where a gesture occurs in the overlap zone 804 of FIG. 7, the gesture control system 100 can determine which occupant made the gesture by analyzing the prior knowledge 128 to determine the paths of the limbs and/or hands of the driver and passenger prior to making the gesture to determine which occupant initiated the gesture. For example, the overlap zone 804 may be located where it would be natural for both the driver and passenger to make a similar gesture, such as adjusting the temperature of the climate control system. Where a passenger does not have permission to adjust the temperature, the system would need to be able to determine which occupant (e.g., driver or passenger) is making the gesture. A further example can be where the driver can use a gesture command to release the parking brake. Again, the system needs to be able to distinguish between the passenger and the driver to ensure that the gesture control system 100 will not execute a parking brake release command made by a passenger within the overlap zone 804. In one implementation, to identify the occupant responsible for a particular gesture, the gesture control system 100 may identify the type of limb performing the detected gesture as well as the limb's position, velocity, and acceleration within the space. Then, the gesture control system 100 can analyze the prior knowledge to identify the position, velocity, and acceleration of similar limbs preceding the detection of the gesture. The gesture control system 100 can then, based upon that analysis, identify a limb in the prior knowledge that is most likely to have been the limb associated with the gesture. Once the limb in the prior knowledge is identified, the movement of that limb can be tracked back through the prior knowledge until the limb can be confidently associated with a particular occupant.

Furthermore, in addition to simply determining whose limbs and/or hands are moving prior to the gesture being made, the prior knowledge 128 can also contain information relating to how certain gestures were made in the past. Further, other data can be analyzed that is contained in the prior knowledge 128 to determine which occupant made the gesture. For example, where motion of a limb and/or hand associated with the gesture is determined to originate from only one of the occupants, the gesture control system 100 can determine that the gesture was initiated by the occupant who had made the previous motion. However, where motions of limbs and/or hands associated with a detected gesture could be associated with multiple occupants, the gesture control system 100 may need to further analyze the prior knowledge 128 to determine which occupant initiated the detected gesture. In one embodiment, the gesture control system 100 can analyze the prior knowledge to determine if the limb and/or hand movements captured prior to the detection of the gesture were moving in a manner previously associated with a particular gesture by a particular occupant. In one embodiment, the gesture control system 100 can analyze the prior knowledge to determine if the trajectories of the limb and/or hand movements captured prior to the detection of the gesture were previously associated with a particular gesture by a particular occupant. Alternatively, the gesture control system 100 can use statistical analysis of past captured gestures or trajectories of gestures, to determine which occupant initiated the gesture. Accordingly, the gesture control system 100 may be able to determine who initiated the gesture by observing how the gesture was performed in the past and using that information to determine which occupant initiated the gesture.

Additionally, where the gesture control system 100 is unable to determine which occupant made the gesture, the gesture control system may present the occupants with a prompt to indicate which occupant made the gesture.

While the above examples discuss distinguishing between occupants to determine which user initiated a gesture command, the gesture control system 100 may not always need to determine which occupant made the gesture. For example, where the gesture command is not restricted based on the type of occupant (e.g. driver vs. passenger) the gesture control system 100 may simply execute the detected gesture command, even where the gesture control system 100 is unable to determine which occupant made the gesture. One example of a non-restricted gesture command could be a volume control command for an audio system.

In one example, pixels associated with the driver and an occupant, as captured by visual sensors 104, can be monitored over time to extract features 126 and generate prior knowledge 128. The gesture control system 100, detecting a gesture, can analyze the prior knowledge 128 to identify whether the gesture originated from the driver or passenger by analyzing the movement of driver and passenger features 126 in the prior knowledge 128 to identify which features 126 were associated with the gesture. The gesture control system 100, identifying features 126 in the prior knowledge 128 associated with the driver or passenger can determine that the gesture was initiated by that occupant. For example, if the gesture control system 100 detects a gesture command, the gesture control system 100 can analyze the prior knowledge 128 for features 126 associated with an individual occupant. The prior knowledge 128, containing a feature 126 of the driver moving an arm prior to the recognition of the gesture, can allow the gesture control system 100 to correlate the feature 126 with the recognized gesture, and thereby determine that the gesture was made by the driver of the vehicle.

While the above example of the occupant differentiation process 900 is described as differentiating between driver and passenger, the occupant differentiation process 900 could also be used to differentiate between multiple passengers in the vehicle as well. Additionally, the occupant differentiation process 900 could also be used to differentiate between multiple users of a gesture control system 100 in any applicable environment.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

What is claimed is:

1. A gesture control system, comprising:
   a processor, the processor in communication with a plurality of sensors;
   the processor being configured to perform the steps of:
   detecting, using the plurality of sensors, a gesture in a volume occupied by a plurality of occupants;
   analyzing a prior knowledge to associate the gesture with one of the plurality of occupants;
   associating a permission level with at least one of the plurality of occupants, wherein the permission level for the gesture is assigned based on whether the at least one of the plurality of occupants is identified using facial recognition as a recognized occupant; and
   generating an output, the output being determined by the gesture, the associated permission level, and the one of the plurality of occupants,
   wherein the output is an alternate operation provided to the one of the plurality of occupants when the permission level associated with the at least one of the plurality of occupants is not sufficient to perform an action associated with the gesture,
   the alternate operation including an access to at least one of a message received via a mobile device, an infotainment control, a climate control, and a navigation control.

2. The system of claim 1, wherein the plurality of sensors include visual sensors.

3. The system of claim 1, wherein the plurality of sensors include audio sensors.

4. The system of claim 1, wherein the processor is further configured to perform the step of extracting a plurality of features associated with each of the plurality of occupants before detecting the gesture.

5. The system of claim 4, wherein one of the plurality of features is a limb of one of the plurality of occupants.

6. The system of claim 5, wherein the prior knowledge is a known trajectory of one of the plurality of features associated with the gesture.

7. The system of claim 1, wherein the permission level is determined based on whether a vehicle is in motion.

8. The system of claim 1, wherein the output is at least partially determined by the permission level associated with the one of the plurality of occupants.

9. A method of transferring control in a gesture control system, comprising:
   determining a presence of a first occupant within a space using a plurality of sensors;
   detecting a gesture performed by the first occupant, the gesture corresponding to a request to transfer control of an operation to at least a second occupant;
   determining the presence of the at least second occupant;
   transferring the control of the operation to the at least second occupant when the presence of the at least second occupant has been determined and based on the at least second occupant being associated with one or more properties meeting one or more predefined rules; and
   returning the control of the operation to the first occupant upon detecting a second gesture performed by the second occupant without detecting a gesture corresponding to a request to return the control of the operation, wherein the second gesture is an action required to respond to an event.

10. The method of claim 9, wherein the event includes a message or a prompt for an input.

11. The method of claim 9, further comprising alerting the first occupant when the presence of the at least second occupant is not determined.

12. The method of claim 9, further comprising determining the position of the at least second occupant.

13. A method, comprising:
   determining a location of a plurality of occupants within a space using a plurality of sensors;
   defining one or more gesture control zones associated with each of the plurality of occupants, each of the one or more gesture control zones having an associated zone permission level;
   adjusting the one or more gesture control zones based on a number of occupants within the space;
   detecting a gesture command within one of the one or more gesture control zones;
   determining a required permission associated with the detected gesture command and the one of the one or more gesture control zones;
   associating a permission level with at least one of the plurality of occupants associated with the detected gesture command, wherein the permission level is assigned based on whether the at least one of the plurality of occupants is identified using facial recognition as a recognized occupant; and
   initiating an output associated with the detected gesture command when the zone permission level and the permission level permits execution of the detected gesture command.

14. The method of claim 13, wherein the one or more gesture control zones are three-dimensional.

15. The method of claim 13, wherein the plurality of sensors includes a visual sensor.

16. The method of claim 13, wherein the one or more gesture control zones are defined based on the location of the plurality of occupants within the space.

17. The method of claim 13, wherein the one or more gesture control zones are pre-defined.

18. The method of claim 13, wherein the one or more gesture control zones are adjusted based upon the location of the plurality of occupants within the space.

19. The method of claim 13, wherein at least a portion of the one or more gesture control zones overlap.

20. The method of claim 9, wherein transferring the control of the operation to the at least second occupant is further determined by the location of the at least second occupant.

* * * * *